(12) United States Patent
Cooper et al.

(10) Patent No.: US 7,264,377 B2
(45) Date of Patent: Sep. 4, 2007

(54) SENSOR-ACTIVATED AUDIBLE STORY LAMP (75) Inventors: Rita Cooper, Alameda, CA (US); Leonard L. Hofheins, Walnut Creek, CA (US)

(73) Assignee: Halo Sun, LLC, Alameda, CA (US)

( * ) Notice: Subject to any disclaimer, the term of this patent is extended or adjusted under 35 U.S.C. 154(b) by 73 days.

(21) Appl. No.: 11/053,787

(22) Filed: Feb. 9, 2005

(65) Prior Publication Data
US 2005/0174777 A1    Aug. 11, 2005

Related U.S. Application Data (60) Provisional application No. 60/586,319, filed on Jul. 8, 2004, provisional application No. 60/543,250, filed on Feb. 10, 2004.

(51) Int. Cl.
*F21V 23/04*    (2006.01)
(52) U.S. Cl. ............ 362/276; 362/802; 362/233; 362/234; 250/214; 340/573.1
(58) Field of Classification Search ............... 362/276, 362/802
See application file for complete search history.

(56) References Cited

U.S. PATENT DOCUMENTS

| | | | |
|---|---|---|---|
| 4,031,320 A | 6/1977 | Brand et al. ............... 179/1 |
| 4,943,712 A | 7/1990 | Wilder ...................... 250/221 |
| 5,307,051 A * | 4/1994 | Sedlmayr ................. 340/573.1 |
| 5,517,264 A | 5/1996 | Sutton ....................... 353/119 |
| D379,458 S | 5/1997 | Muller et al. ............. D14/168 |
| 5,673,022 A | 9/1997 | Patel ......................... 340/565 |
| 5,726,629 A * | 3/1998 | Yu ............................. 340/565 |
| 5,763,872 A * | 6/1998 | Ness ................... 250/214 AL |
| 6,028,515 A | 2/2000 | Eisinger ..................... 340/541 |
| 6,561,672 B2 | 5/2003 | Lessard ..................... 362/234 |
| 2005/0111213 A1* | 5/2005 | Smith ......................... 362/95 |
| 2005/0276051 A1* | 12/2005 | Caudle et al. .............. 362/276 |

* cited by examiner

*Primary Examiner*—Renee Luebke
*Assistant Examiner*—Jessica L. McMillan
(74) *Attorney, Agent, or Firm*—Kunzler & McKenzie (57) ABSTRACT

An apparatus, system, and method are disclosed for sensing the presence of a person and directing an audible message to the person. The apparatus, in one embodiment, is configured to provide an interactive lamp that includes a housing, one or more sensors disposed within the housing, one or more speakers connected with the sensor, a light source for emitting light that functions independently of the sensor, and a microcontroller disposed within the housing for initiating communication of the audible message in response to a sensor event detected by the sensor. The audible message of the sensor-activated story lamp may comprise one or more messages that may be used for multiple purposes.

29 Claims, 10 Drawing Sheets

SENSOR-ACTIVATED AUDIBLE STORY LAMP

CROSS-REFERENCES TO RELATED APPLICATIONS

This application claims priority to U.S. Provisional Patent Application No. 60/543,250 entitled "MOTION SENSOR-ACTIVATED SOUND NIGHT LIGHT" and filed on Feb. 10, 2004 and application Ser. No. 60/586,319 entitled "SENSOR-ACTIVATED AUDIBLE NIGHT LIGHT" and filed on Jul. 8, 2004 for Rita Cooper, which is incorporated herein by reference.

BACKGROUND OF THE INVENTION

1. Field of the Invention

This invention relates to lamps and night lights and more particularly relates to lamps and night lights for sensing the presence of a person and directing an audible message to the person.

2. Description of the Related Art

Lamps and night lights known in the art are often used not only for lighting, but also for decoration. To add variety to a room, lamp shades or bulb coverings frequently include interesting patterns, designs, or characters; particularly lights intended for children often boast colorful and lively images including well-known cartoon characters. In certain instances, a small light placed near a child's bed or the like may additionally provide comfort to a child who is afraid of the dark or afraid of being alone. The lights typically are manually operated and emit only light. Some night lights may include photo-sensors to conserve energy.

While decorative night lights and lamps provide light and some aesthetic appeal, the lights typically fail to provide an intermediate interaction level with the user. For example, when a child is stirring or upset before bedtime or during the night, parents often must go to the child to comfort and reassure the child. Reading books and playing music are common activities to calm children, in addition to the lighting or aesthetic designs provided by a lamp or night light. Yet, parents typically do not want to go repeatedly to a child's room during the night to calm an active or emotional child. An intermediate level of interaction to comfort a child may reduce the number of times a parent must visit a child throughout the night.

In another scenario, a child may require reassurance from a mother's voice or the like while the child is alone or sleeping at another home. A simple night light or lamp generally fails to provide interaction with the child and may not provide adequate comfort to the child. Without an intermediate level of interaction, the child may experience distress and discomfort.

From the foregoing discussion, it should be apparent that a need exists for an apparatus, system, and method for providing an interactive night light or comfort lamp. Beneficially, such an apparatus, system, and method would sense the presence of a person, such as a child, and direct an audible message to the person. As a result, a child or user would be able to trigger a sensor event such as with motion, a child's voice, or the like and would subsequently be provided an audible response. The audible message would preferably provide comfort, direction and/or companionship to a user as an interactive response to the sensor event. As a result, the audible response would comfort the user and beneficially alleviate the burdens of others involved, such as parents, sitters, or the like.

SUMMARY OF THE INVENTION

The present invention has been developed in response to the present state of the art, and in particular, in response to the problems and needs in the art that have not yet been fully solved by currently available lamps and night lights. Accordingly, the present invention has been developed to provide a sensor-activated story lamp for sensing the presence of a person and directing an audible message to the person that overcomes many or all of the above-discussed shortcomings in the art.

The apparatus, in one embodiment, is configured to provide an interactive lamp that includes a housing, one or more sensors disposed within the housing, one or more speakers connected with the sensor, a light source for emitting light that functions independently of the sensor, and a microcontroller disposed within the housing for initiating communication of the audible message in response to a sensor event detected by the sensor. The apparatus may further include a memory device connected to the microcontroller for storing at least one audible message. In one embodiment, the sensor may comprise a motion sensor. In an alternative embodiment, the sensor may comprise an audio sensor and/or a touch-sensitive switch. Alternatively or in addition, a combination of sensors may be used to activate an audible message. A sensor may comprise anything that receives a stimulus and responds to it.

The audible message of the sensor-activated story lamp may comprise one or more messages that may be used for multiple purposes. In a contemplated embodiment, the audible message may be a story or a song. The story lamp, in one embodiment, may contain various recorded messages that enable the user to select the message to be transmitted in order to adequately respond to a specific sensor or condition. In one embodiment, the story lamp includes a rewritable memory device such that the user may record a personalized message. In a further embodiment, the memory device is removable.

The story lamp may further include one or more wireless communication devices, such as a radio receiver or the like, to enable the story lamp to communicate with other electronic devices. As a result, the story lamp may be activated by another electronic device. In a further embodiment, the story lamp may be connected to a wireless network to provide remote access to the story lamp from a computing device. Consequently, a user may record a sound message on a separate device, such as a computer or cellular phone, and then transmit the message to the story lamp through the network. The story lamp may also be programmable, offering the user several options for setting up the story lamp according to personal preferences. In one embodiment, the user may download audible messages from an internet website and transmit the audible message to the story lamp.

The story lamp of the present invention may further comprise a USB connection. Consequently, a user may be able to connect the story lamp directly to a computer or other USB compatible device. Once a USB connection is established, the user may program the story lamp, transmit or store recorded messages, or transfer download prerecorded messages from another source such as an internet website.

A system of the present invention is also presented to sense the presence of a person and to direct an audible message to the person. The system, in one embodiment, includes a story lamp that comprises a housing, a sensor, a speaker, a light source, and a microcontroller, and one or more removable memory devices. The system may further include a companion electronic transmitting/receiving device and a rack for storing a set of removable memory devices.

A method of the present invention is also presented for activating an audible message. The method in the disclosed embodiments substantially includes the steps necessary to carry out the functions presented above with respect to the operation of the described apparatus and system. In one embodiment, the method includes providing a story lamp with a motion sensor, detecting a motion and sending a communication to the microcontroller, retrieving an audible message, and transmitting the audible message to a speaker.

In a further embodiment, the method includes providing a story lamp with a wireless communication device, receiving a communication via a wireless communication, and retrieving an audible message. The method may further include transmitting the audible message to a speaker and storing the audible message in a memory device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables a user to interact with a sensor-activated story lamp. In addition, the user may create or select a plurality of audible messages to be communicated responsive to a sensor event. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
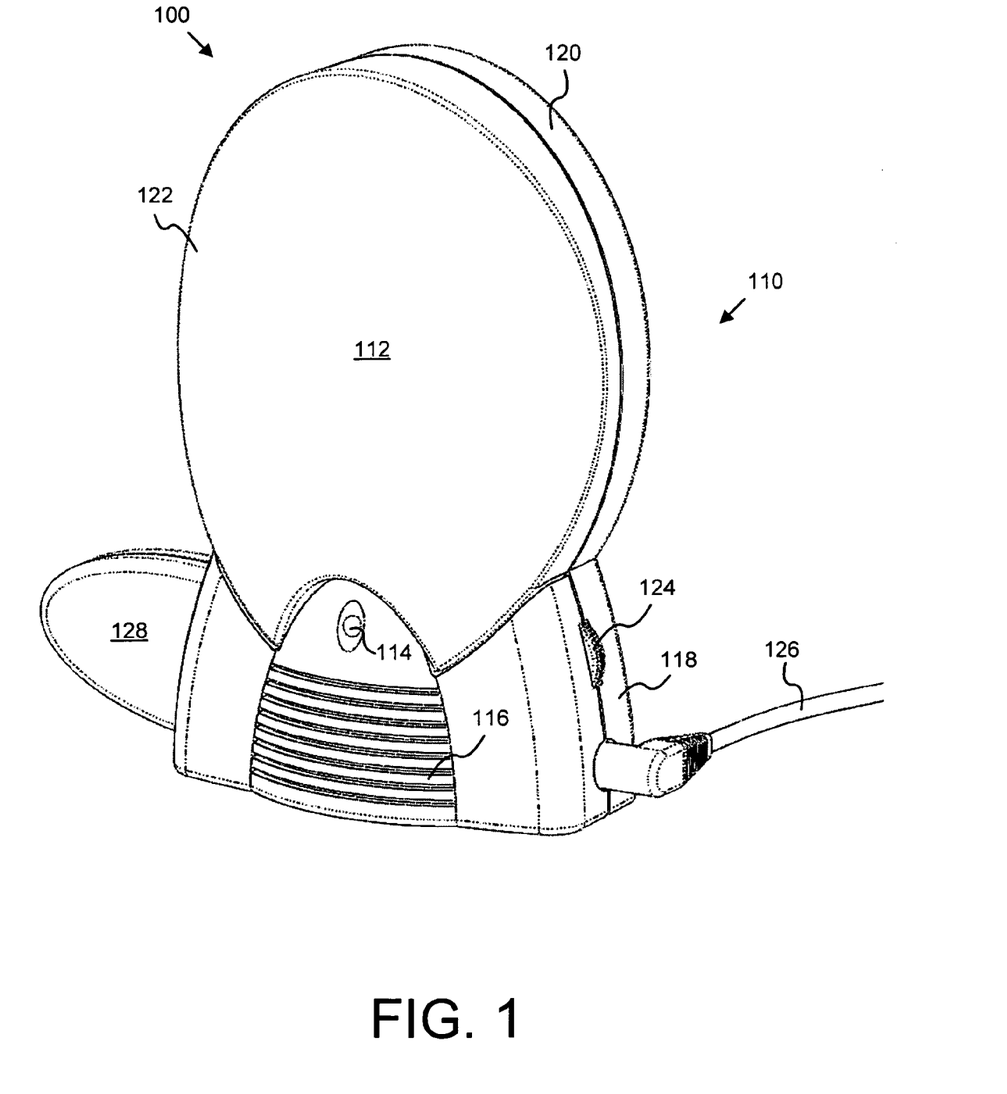
FIG. 1 is a perspective view illustrating one embodiment of a story lamp in accordance with the present invention.

FIG. 1 illustrates one embodiment of a story lamp 100 of the present invention. As depicted, the story lamp 100 comprises a housing 110 with a base 118 and an extension 120 for receiving a decorative lens 122, a light source 112, a sensor 114, a speaker 116, a switch 124, a power cord 126, and a memory device 128. A user may trigger the sensor 114 to activate an audible message. In one embodiment, the audible message is digitally stored on a removable memory device 128 such as a memory card.

The housing 110 preferably retains the functional components of the story lamp 100. In a contemplated embodiment, the base 118, which is made of sturdy plastic, stabilizes the story lamp 100 and supports the light source 112. The extension 120, which may be bowl-shaped, may receive a decorative lens 122. Of course, the size and shape of the housing 110 may vary according to each embodiment. For example, the housing 110 may be shaped to resemble a recognizable object. In one embodiment, the base 118 may further be configured to plug directly into a standard outlet similar to other night lights known in the art.

The light source 112 may comprise standard light bulbs and may be configured to provide a sustained source of light similar to other night lights or lamps known in the art. In a preferred embodiment, the light source functions independently of the sensor(s) associated with the audible message such that the user may selectively use the lamp function without triggering an audible message. Alternatively or in addition, a sensor event may trigger a supplementary light source or may activate a lighting effect. In a contemplated embodiment, the light source 112 comprises LED (light emitting diodes) lights, which are durable and energy-efficient, providing long-lasting quality and efficiency. In one embodiment, a plurality of LED lights may be used to create special lighting effects, such as an illusion of motion. In a select embodiment, an array of colored LED lights is configured to pulsate relative to an audio message.

The sensor 114 detects a sensor event. Specifically, one or more sensors 114 may be configured and/or combined to detect the presence of a person. The sensor 114 may comprise any sensor that adequately functions with the present invention. In one embodiment, the sensor 114 comprises a motion sensor. The motion sensor 114 may be an active sensor, such as those that send out beams of light, microwave radio energy or ultrasonic sound waves to detect the presence of a person. Alternatively, the motion sensor 114 may be a non-transmitting system that detects infrared energy or the like. Other sensors 114 or devices maybe used in conjunction with the motion sensor 114, such as light sensors, timers, and the like.

In one embodiment, the sensor 114 is an audio sensor. The audio sensor 114 may include a microphone and a sound sensor calibrated to react to the voice of a person such as a child. Alternatively or in addition, a touch-sensitive switch or the like may enable the user to activate an audible message by touching the housing 110 or the base 118. Other sensors 114 and/or combination of sensors 114 may be conceived to detect the presence of a person. Thus, the present invention is not limited to the illustrated embodiments.

To transmit an audible message, one or more speakers 116 may be connected to the sensor(s) 114, preferably through a microcontroller. In one embodiment, the speakers 116 are small, similar to the standard speakers 116 used in small radios, and are integrated into the base 118 of the story lamp 100. Alternatively or in addition, the story lamp 100 may include a connector to attach peripheral speakers. When the sensor 114 is triggered, an audible message may be transmitted from the microcontroller to the speakers 116 to produce an audible response.

An audible message of the story lamp 100 may be selected from a plurality of messages that may be used for multiple purposes. For example, the audible message may include a voice message, music, waves, stories, chimes, bird chirps, educational material, religious chants or hymns, nursery rhymes, seasonal themes, or the like. In one embodiment, the user may be able to choose or specify which sound(s) will be transmitted when the sensor(s) 114 are activated. For example, the audible message may be pleasant and reassuring, such as a mother's voice or music, to calm restless children when the mother is not present or when children are sleeping away from home. Alternatively, the sounds may be informative, such as a message reminding a child of a house chore that needs to be done. Other messages may be entertaining, such as a talking dog lamp or night light or a fairy tale told by a related character. Further still, the audible message may comprise a warning, such as an alarm.

The present invention includes multiple embodiments to address the personal needs of a user. In certain embodiments, the story lamp 100 is directed toward a specific age group or target audience. In one embodiment, the story lamp 100 contains a memory chip that can store prerecorded messages lasting up to five minutes. One chip may contain a medley of five different messages. Thus, when the sensor (s) 114 are activated, the story lamp 100 plays one or all of the five prerecorded messages.

Prerecorded messages simplify the device and decrease production costs. Prerecorded messages may also enhance the characteristics of entertaining story lamps. For example, a cartoon voice message may accompany a cartoon-shaped housing 110 or decorative lens 122. The story lamp 100, consequently, becomes an interactive companion. A user may activate the sensor(s) 114 of the story lamp 100 to hear a message, such as a story told in the voice of the cartoon character. Of course, alternative embodiments may include various forms of memory or storage that may enable the story lamp 100 to store additional messages.

In one embodiment, the story lamp 100 contains a plurality of recorded messages, enabling the user to select the message to be transmitted to adequately respond to a specific sensor or condition. For example, the user may select to receive a personal reminder in the morning or a bedtime story at night. In one embodiment, the sound emitted from the story lamp 100 may be an audible message recorded by the user and stored in the story lamp 100. Accordingly, the messages may be personalized and may be changed frequently if desired. For example, a mother may record herself singing or may record a reassuring message for a child. Consequently, when the sensor(s) 114 are activated, the personal recording is transmitted through the speakers 116.

A microphone may be used to record or update sound messages. In one embodiment, the user speaks into the microphone or introduces another sound. The microphone subsequently transmits the sound message to a microcontroller. The microcontroller then stores the sound message in a memory device, where the sound message may be accessed for later use.

In one embodiment, a switch 124 or controls may enable the user to select a message or to control whether a sensor 114 is active. In one embodiment, the switch 124 may be a three-way switch: off, light on, and light and audio response on. In a further embodiment, the story lamp 100 may further include a control panel or the like to enable the user to program the story lamp 100 or to select a type of sensor 114. The controls may be modified according to the embodiment. In one embodiment, the controls include a record button to enable the user to record a personal message.

The story lamp 100 may comprise one or more power sources. In one embodiment, the story lamp 100 comprises an AC/DC adapter cord 124 configured to plug into a standard electrical outlet. The cord 124 may be configured to meet the standard of a particular country. In addition, the story lamp 100 may be battery powered or may include a battery backup system. As mentioned, one embodiment of a story lamp 100 may plug directly into an outlet. Various power sources may be suitable. In one embodiment, a six foot cord provides the story lamp with great versatility in positioning.

Figure 2A:
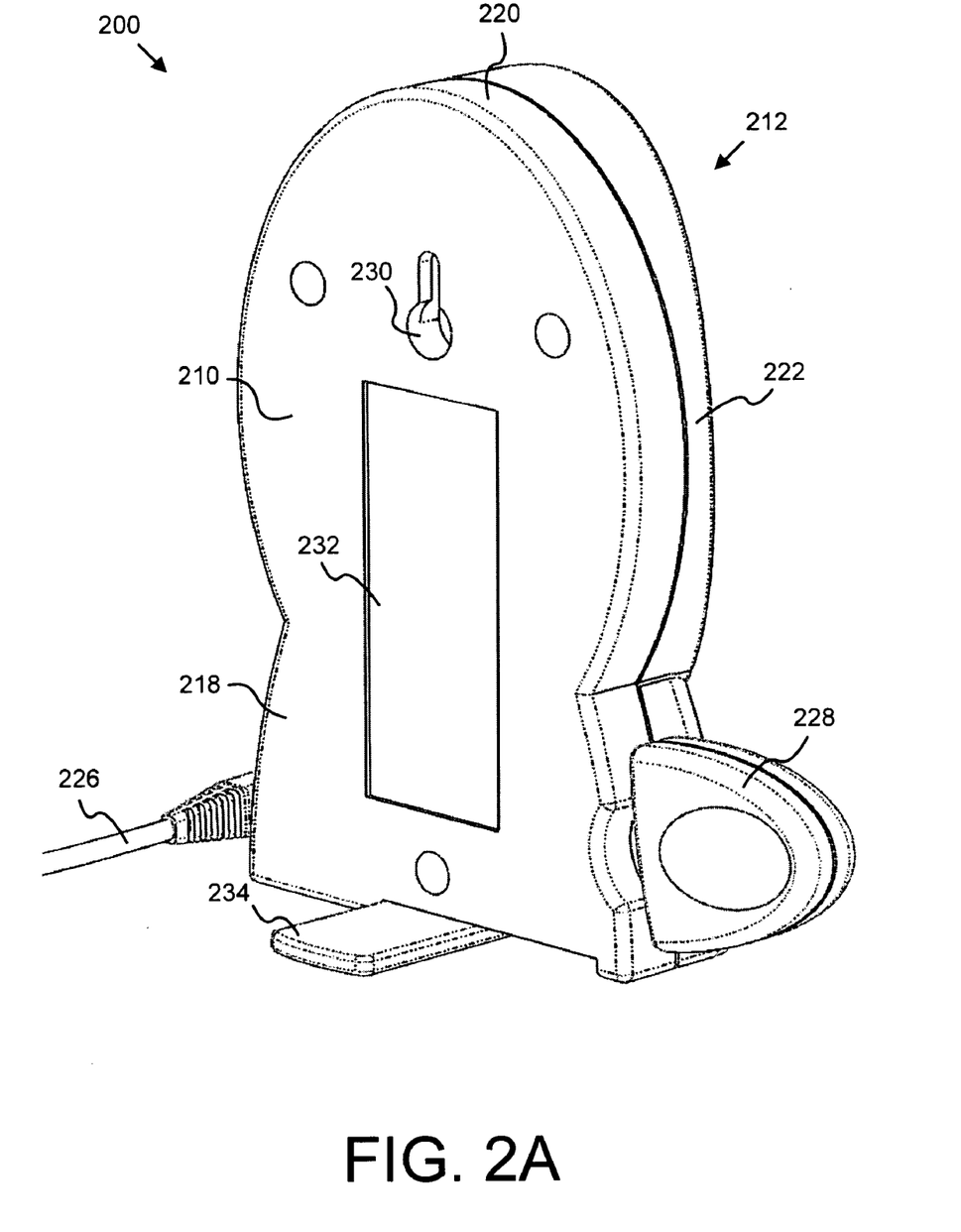
FIG. 2A is a back perspective view illustrating one embodiment of a housing in accordance with the present invention.
Figure 2B:
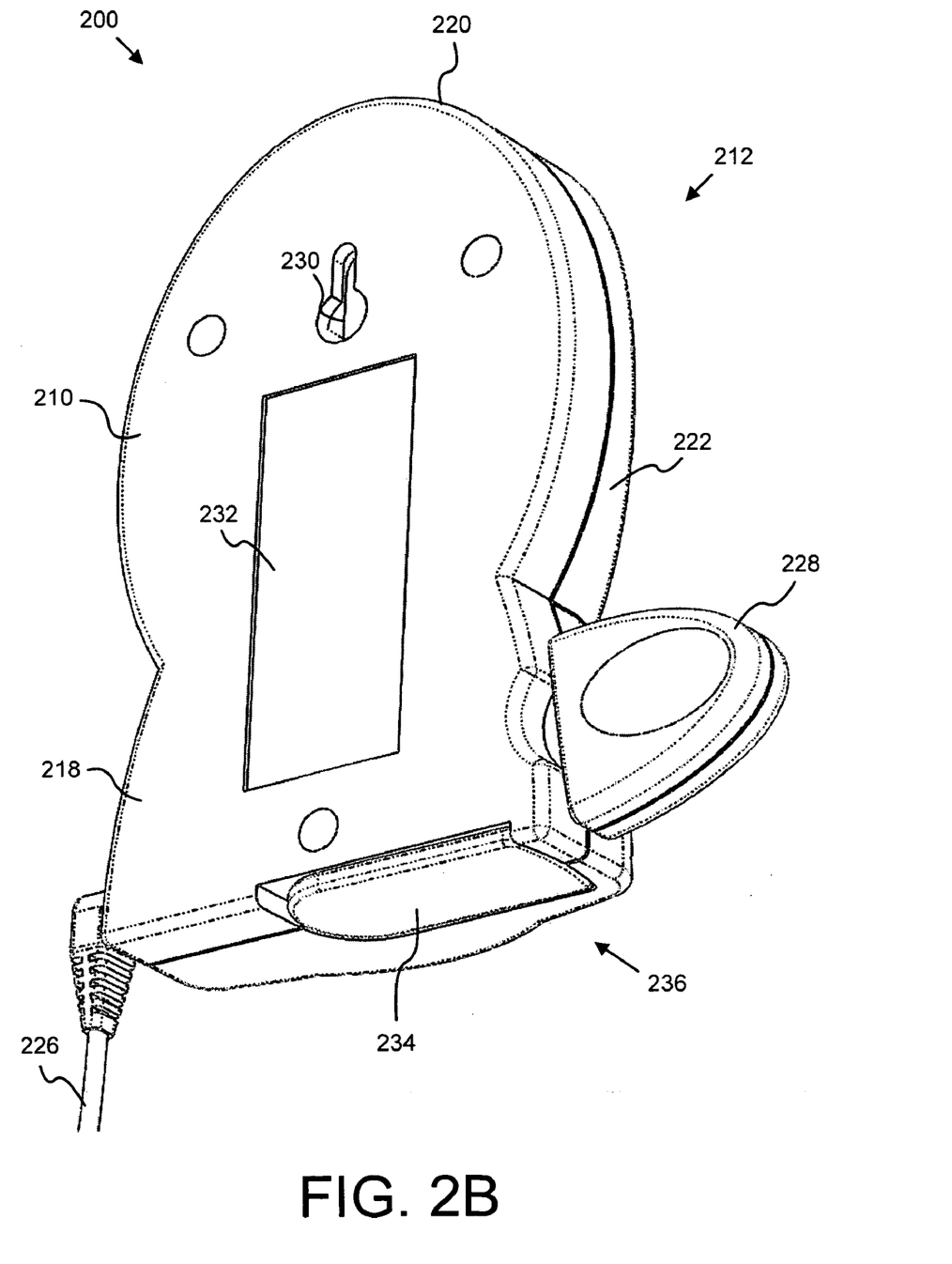
FIG. 2B is a back perspective view further illustrating one embodiment of a housing support in accordance with the present invention.

FIGS. 2A and 2B further illustrate a back view of one embodiment of a story lamp 200. The housing 210 of the story lamp 200, as depicted, is configured to stand alone on a flat horizontal surface or to hang on a vertical surface. As illustrated, the story lamp 200 may comprise a housing 210 with a base 218 and an extension 220, a light source 212, a decorative lens 222, a cord 226, and a memory device 228. The housing 210 may further include a hanger slot 230 for wall mounting, a recessed area 232 for receiving an adhesive such as 3M® Command Adhesive, and/or a housing support 234. In one embodiment, the housing support 234 is pivotally connected to the housing 210 to enable the story lamp 200 to hang adjacent a vertical surface. FIG. 2B illustrates the housing support 234 in a stored position 236 contiguous the bottom side of the base 218.

Figure 3:
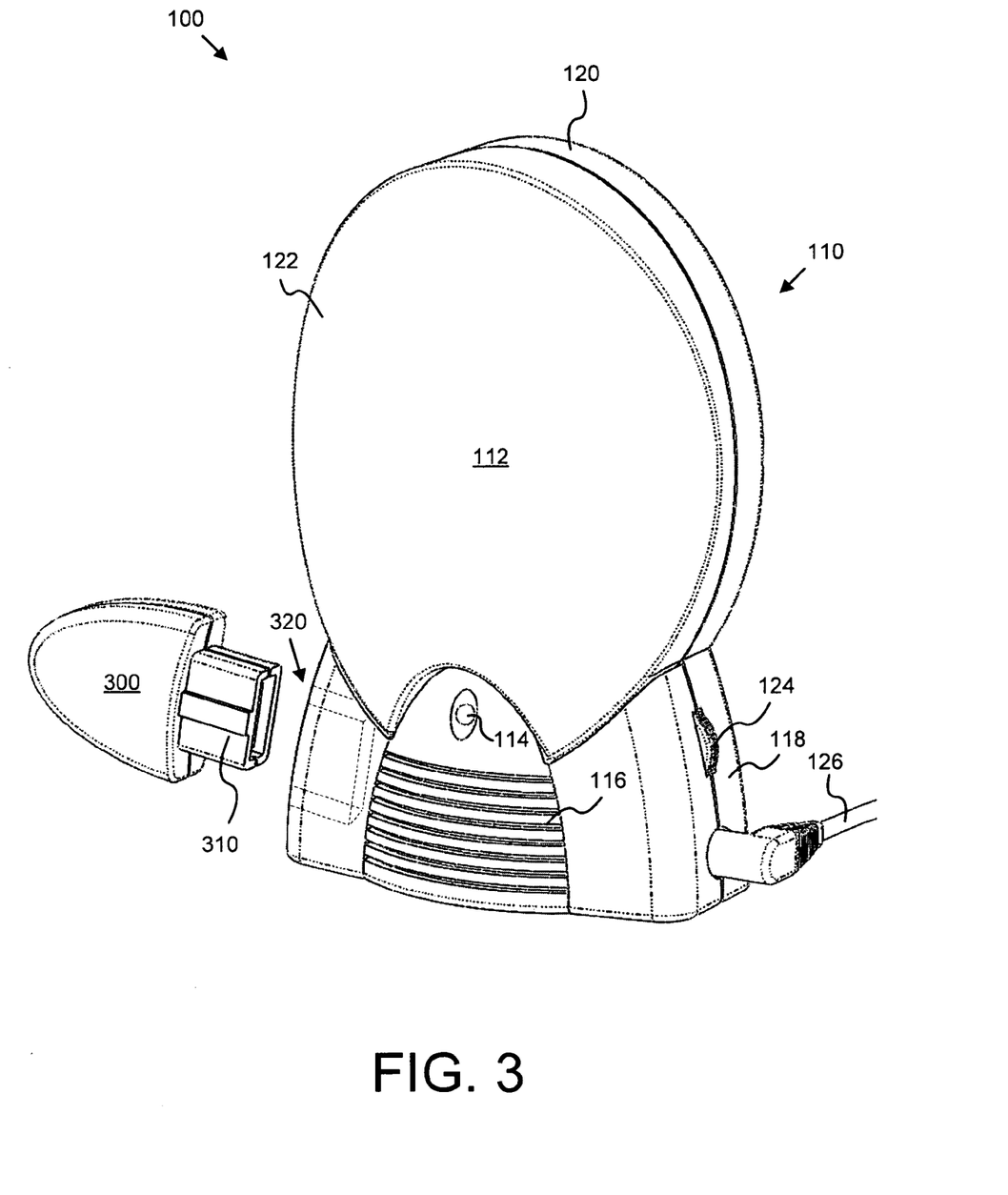
FIG. 3 is a front perspective view illustrating one embodiment of a story lamp with a removable memory device in accordance with the present invention.

FIG. 3 illustrates one embodiment of a removable memory device 300 with a story lamp 100 of FIG. 1. In one embodiment, the memory device 300 comprises a memory card with a USB connection device 310. Accordingly, the story lamp 100 may comprise a corresponding USB connection such as a USB port 320.

In one embodiment, the memory device 300 comprises read only memory. An audible message such as a story may be stored on the memory device 300. In a contemplated embodiment, the memory card stores a twenty minute story narrated with interesting sound effects and the like. Placing the removable memory device into the USB port 320 may override the internal memory of the story lamp 300 in certain embodiments. For example, if a memory chip is stored within the housing 110, the microcontroller may retrieve an audible message from the removable memory device 300 rather than the internal memory chip when the sensor 114 is activated. Consequently, the user may easily select the message he/she desires to hear by inserting a selected memory device 300 into the housing 110. Alternatively, one or more selected message may be communicated to the memory lamp 100 through other forms of communication and connections such as a wireless communication, a network, an adapter, and the like.

In one embodiment, the memory device 300 comprises rewritable memory, such as flash memory, secure digital (SD) cards or the like, to enable the user to store one or more selected audible messages on the memory device 300. In one embodiment, a user may access an audible message from a network such as a personal computer or an internet site. The story lamp 300 may store the audible message internally or may store the audible message in a removable memory device 300.

Figure 4:
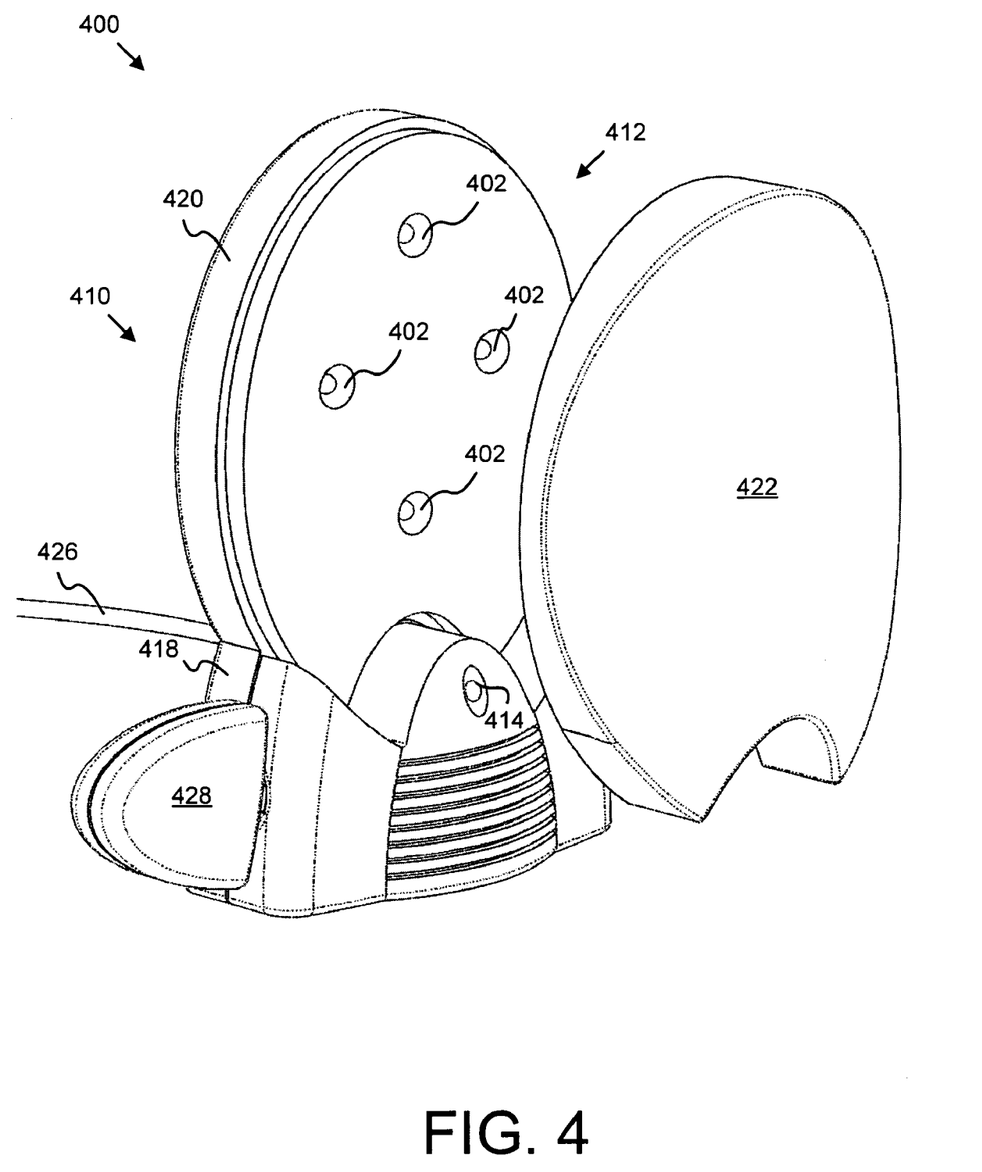
FIG. 4 is a perspective view illustrating one embodiment of a removable lens in accordance with the present invention.

FIG. 4 illustrates one embodiment of a removable lens 422 corresponding to one embodiment of a story lamp 400. As illustrated, the story lamp 400 may comprise a housing 410 with a base 418 and an extension 420, a light source 412, a sensor 414, a lens 422, a cord 426, and a memory device 428. The lens 422 may be decorative and may be removable and interchangeable. In one embodiment, the light cover 422 is customizable. For example, the light cover 18 may contain a picture of a family member or a familiar cartoon character. In one embodiment, the lens 422 is semi-transparent and contains scenes from a story. In a contemplated embodiment, the decorative lens 422 corresponds to an audible message. Thus, the lens 422 may be changed to correspond to a selected audible message, such as an audible message stored on the removable memory device 420.

FIG. 4 further illustrates a plurality of LED lights 402 supported by the extension 420 of the housing 410. In one embodiment, the LED lights 402 are arranged in an array of colored lights that pulsate responsive to an audible message, thereby creating an illusion of motion. In one embodiment, the story lamp 400 may comprise a decorative lens 422 with an image from a story thereon. When a user activates the sensor(s) 414, the audible message may comprise additional information to activate the pulsation of the lights relative to the audible message, such as during sound effects, music, or the like.

Figure 5:
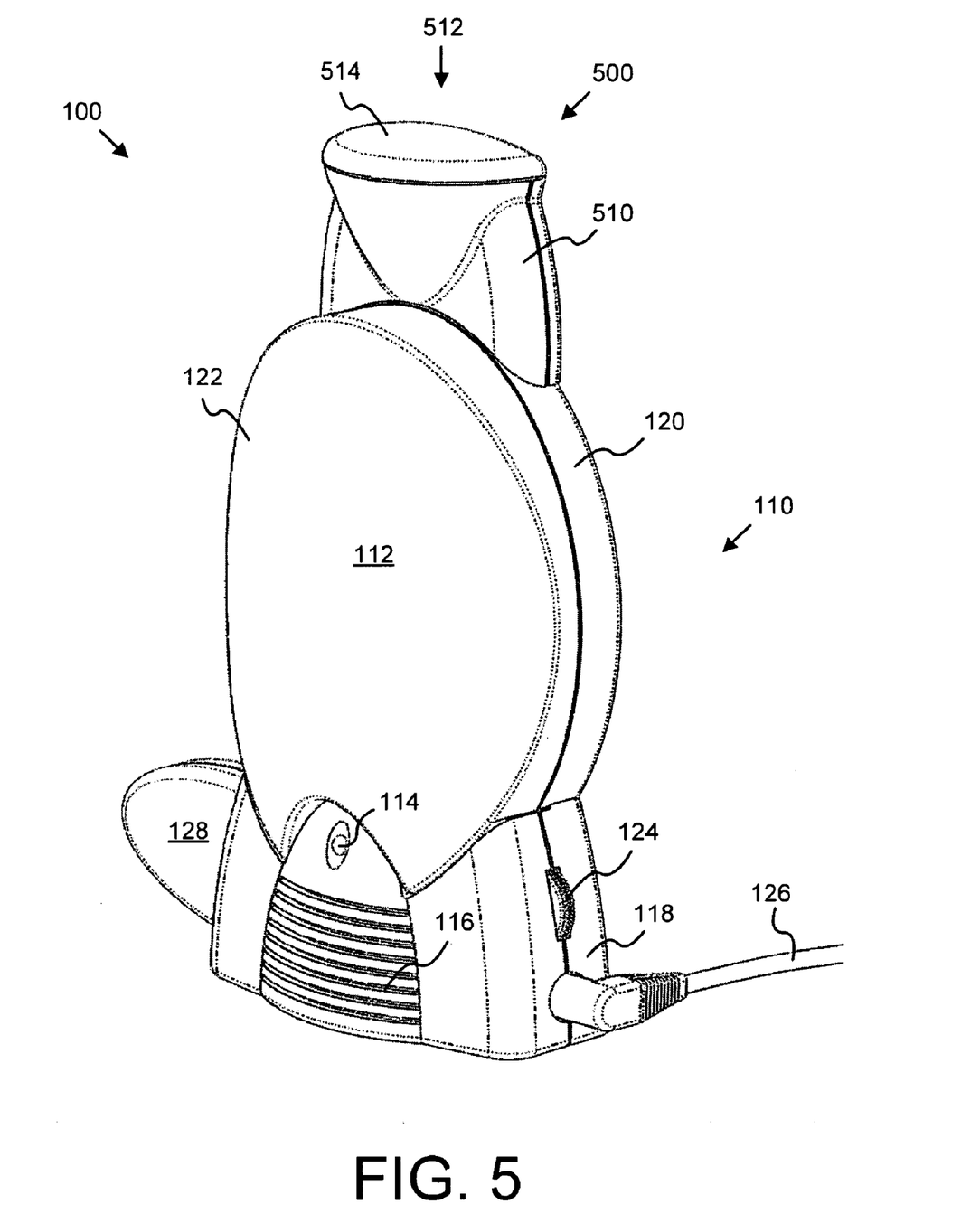
FIG. 5 is a perspective view illustrating one embodiment of a removable projector lens in accordance with the present invention.

FIG. 5 illustrates one embodiment of a projector lens 500 depicted in relation to a story lamp 100 of FIG. 1. The projector lens 500, as depicted, includes a base 510, a light source 512, and a lens 514. The projector lens 500 enables the user to view images projected on a surface, such as the ceiling or a wall. The images may be related to a particular audible message, such as a story or educational material. Similar to the decorative lens 422 (FIG. 4), the projector lens 500 maybe removable and interchangeable, enabling the projector lens 500 to be changed to correspond to an audible message. Alternatively or in addition, the lens 514 may be removable.

In one embodiment, the light source 512 comprises an array of super bright LED lights. The lights may be colored, in certain embodiments, and may be configured to pulsate, alternate brightness, or the like to produce a special lighting effect. The lens 514 may be a translucent lens with printed material thereon. In one embodiment, the printed material may contain sequential images. In a further embodiment, the lens 514 may be configured to rotate. The LED lights may be configured to correspond to the images on the lens 514. The base 510 may comprise a connector (not shown) to connect the projector lens 500 to the housing 110. In addition, the connector may provide power to the projector lens 500.

Figure 6:
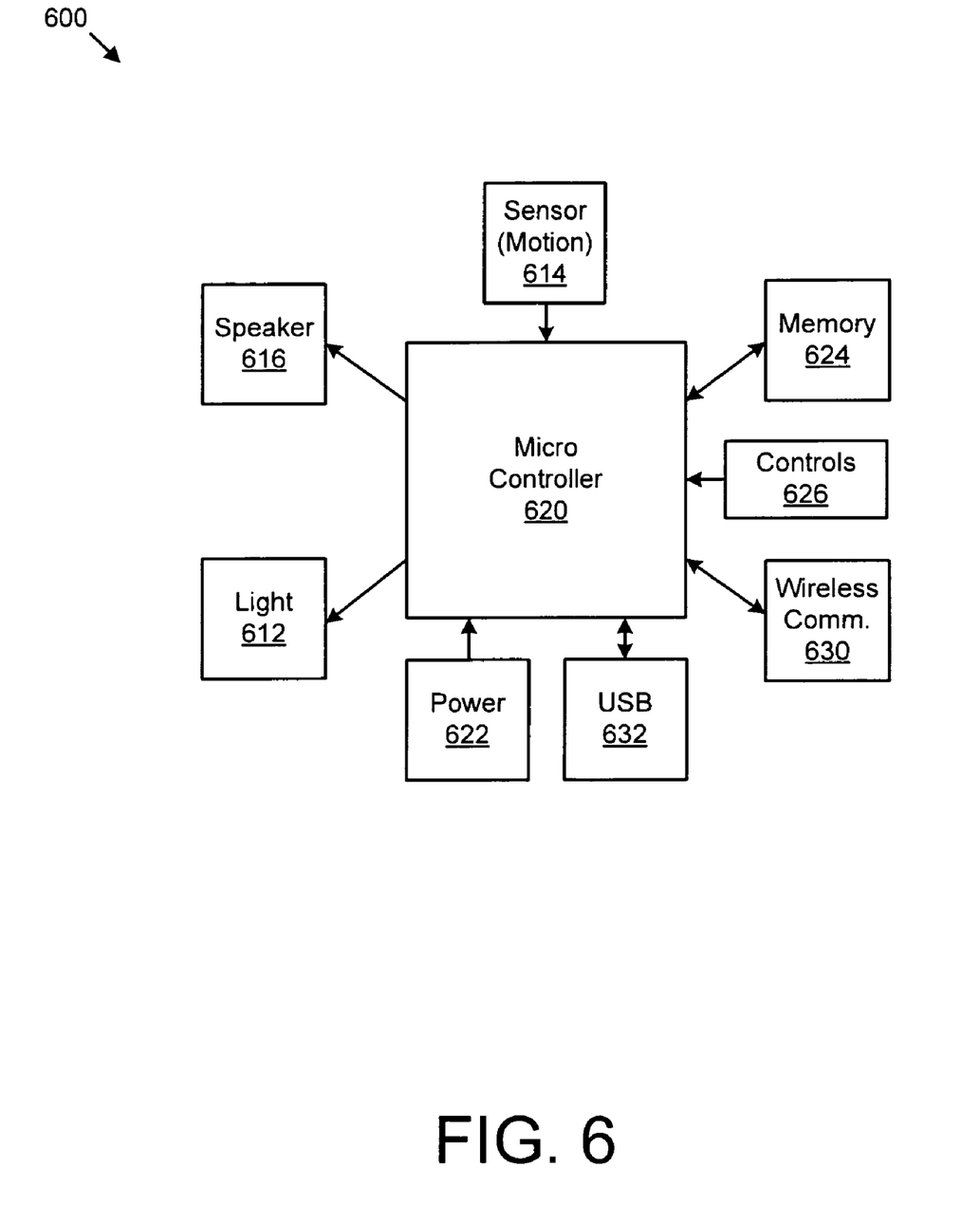
FIG. 6 is a schematic block diagram illustrating one embodiment of a story lamp in accordance with the present invention.

FIG. 6 illustrates a schematic block diagram of one embodiment of a story lamp 600 with a wireless communication device 630 to provide a wireless connection. The story lamp 600 may comprise a light source 612, a sensor 614, speakers 616, a microcontroller 620, a power source 622, a memory device 624, controls 626, a wireless communication device 630, and/or a USB connection 632. The wireless communication device 630 may enable the user to program the story lamp 600 and to transmit, activate, or store audible messages from a remote location. The story lamp 600 may further include a motion sensor 614 to activate the audible message.

The microcontroller 620 controls the storage, input, and output of the audible story lamp 100 and is preferably configured to transmit a sound signal to one or more speakers 616 in response to a motion detected by the sensor 614. A power source 622 may supply energy to the microcontroller 620 accordingly. In one embodiment, the microcontroller 620 comprises an internal electronic impulse switch that activates the audible message.

To transmit the audible message, the microcontroller 620 may access a memory device 624, where audible messages may be stored. The memory device 624 may comprise a variety of memory types or memory chips. One memory type may include Electrically Programmable Read-Only Memory (EPROM). An EPROM chip is advantageous because it stores data without power. Hence the memory can be maintained without occupying much space and without being directly connected to a power source.

Controls 626 may be an optional feature on the story lamp 600 and may vary with each embodiment. The controls 626 may enable the user to have manual control over options, such as adjusting the volume, turning on the light source 612, listening to audible messages, recording audible messages, deactivating the sensor 614, activating a microphone (not shown), selecting sound messages, and the like. The controls 626, in addition to the sensor 614, may provide an alternative way to activate/deactivate an audible message.

In addition to receiving audible messages through the USB connection 632, the microcontroller 620 may also communicate with another computing device or the like through the USB connection 632, thereby enabling reception of programming or other instruction from another computing device. Consequently, the user may program a timer or the like to retrieve a selected message during a determined period of time. Programming increases the options available to the user.

Figure 7:
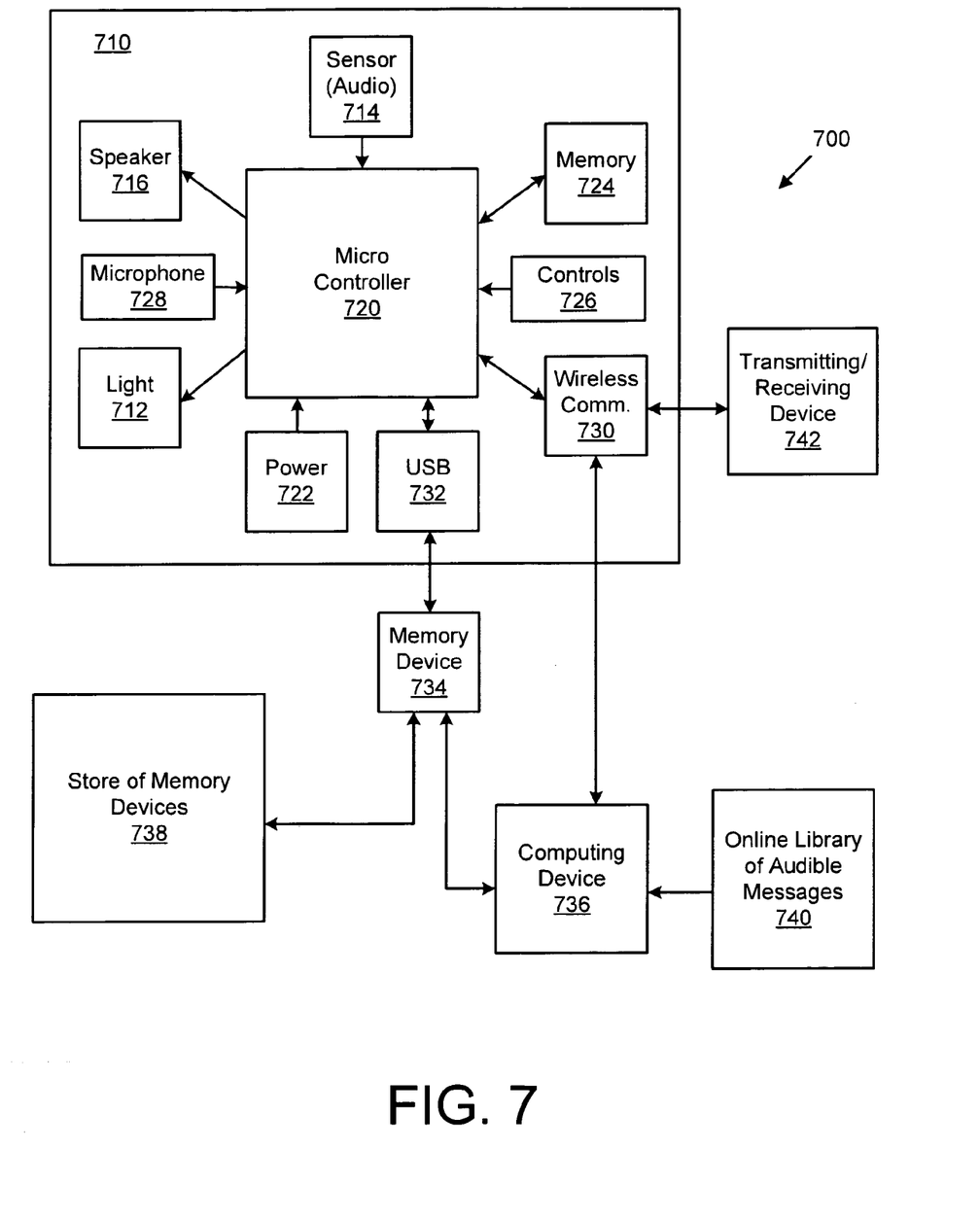
FIG. 7 is a schematic block diagram illustrating one embodiment of a story lamp system in accordance with the present invention.

FIG. 7 illustrates one embodiment of a story lamp system 700 of the present invention. The story lamp system 700, as illustrated, includes a story lamp 710, a store of memory devices 738, a removable memory device 734, a computing device 736, an online library of audible messages 740, and an electronic transmitting/receiving device 742. The story lamp 710 may be similar to the story lamps illustrated in FIGS. 1-6. In the depicted embodiment, the story lamp 710 comprises a light source 712, a speaker 716, an audio sensor 714, a microcontroller 720, a power source 722, a memory device 724, controls 726, a USB connection 732, and a wireless connection 730. The audio sensor 714 may include a microphone 728, which may also be used to fabricate audible messages. When the ambient sound level surpasses a predetermined sound level, the audio sensor 714 may notify the microcontroller 720. The microcontroller 720 may then retrieve an audible message stored in the memory 724 of the story lamp 710 and transmit the message to the speaker 716.

A story lamp 710 that includes an audio sensor 714 such as the story lamp 710 may be useful to calm children who cry at night. Once triggered, the microcontroller 720 may retrieve a lullaby or a children's story. Alternatively, the story lamp 710 may function as an interactive companion to whom a child may talk and receive an audible response.

In certain embodiments, the story lamp 710 may include a voice recognition system to activate a specific message. The voice recognition system may recognize commands or may recognize a person's voice. Alternatively or in addition, the story lamp 710 may select a message based on varying sound levels. For example, a softer sound may trigger a song, while a louder sound may activate a story. In a further embodiment, multiple sensors 714 may be used to activate multiple messages. For example, a child's story lamp 710 may play a song or story when activated by a child's voice and may give instructions when activated by motion. In a further embodiment, a child's story lamp 710 wirelessly networked to another story lamp 710, such as parent's story lamp 710, may play a sound message when activated by the audio sensor 714 and may wirelessly activate the audible message of the parent's story lamp 710 when the motion sensor is triggered.

The story lamp 710, in one embodiment, may further include one or more wireless communication devices 730, such as a radio receiver/transmitter or the like, to enable the story lamp to communicate with other electronic transmitting/receiving devices 742. As a result, an audible message may be activated by another electronic transmitting/receiving device 742. For example, a doll containing a signal transmitter may activate one or more audio message(s) of the story lamp 710; or another story lamp 710 may transmit an audible message or a sensor event.

In a further embodiment, the story lamp 710 may be connected to a wireless network to provide remote access to the story lamp 710 from a computing device 736. Thus, a user may record a sound message on a separate device, such as a computer, PDA, cellular phone or the like, and then transmit the message to the story lamp 710 through the network.

The USB connection 732 provides great flexibility to the story lamp 710. As mentioned, the story lamp 710 may access audible messages stored on a removable memory device 734. In one embodiment, the user may select a removable memory device 734 from a store 738 of memory devices 734. In one embodiment, a rack may be provided to organize and protect the plurality of removable memory devices 734. In one embodiment, the store 738 of removable memory devices 734 may comprise a set of related material, such as a library or collection of audibly narrated stories or educational or religious material.

In addition, a user may be able to connect the story lamp 710 directly to a computing device 736. Once a USB connection is established, the user may program the story lamp 710, save recorded messages to the story lamp 710 or to a removable memory device 734, download prerecorded messages from another source such as an internet web-site providing an online library of audible messages, and transfer the messages to the story lamp 710. The online library 740 may provide a resource of materials to the user.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Additionally, the order in which a particular method occurs may or may not strictly adhere to the order of the corresponding steps shown.

Figure 8:
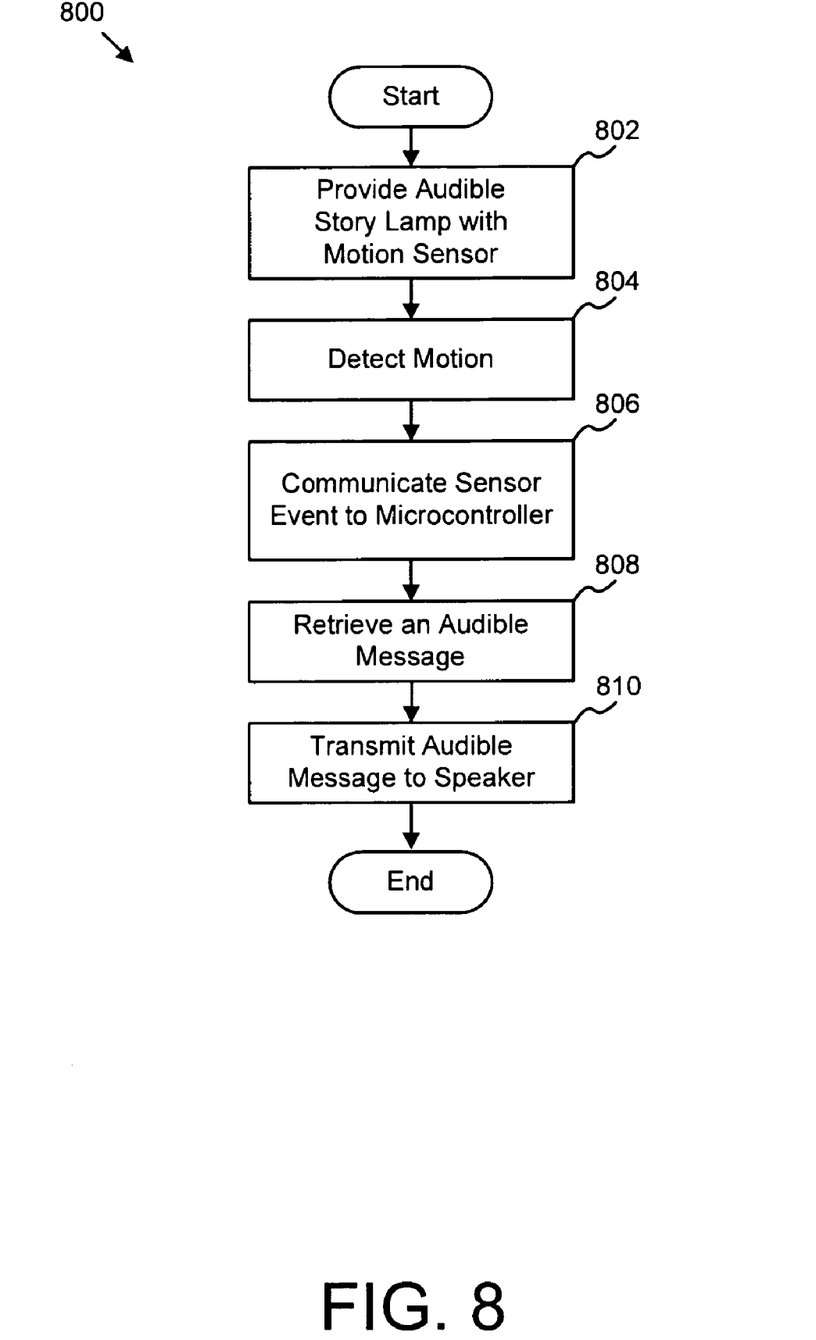
FIG. 8 is a schematic flow chart diagram illustrating one embodiment of an motion-sensor activation method in accordance with the present invention.
Figure 9:
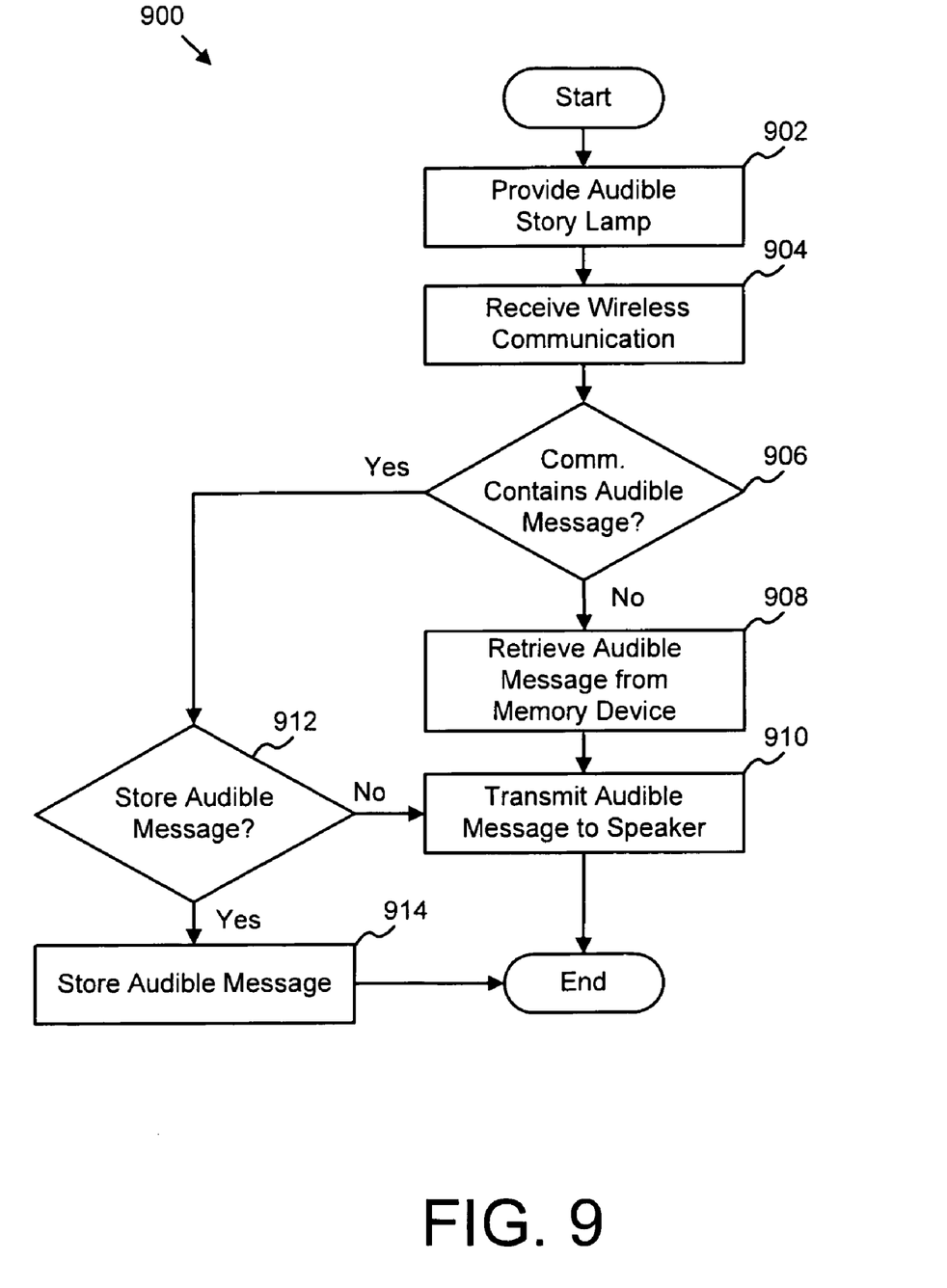
FIG. 9 is a schematic flow chart diagram illustrating one embodiment of a wireless activation method in accordance with the present invention.

FIGS. 8 and 9 illustrate possible embodiments of methods for activating an audible message of a story lamp. For illustrative purposes only, reference is made to story lamp 600 of FIG. 6 to describe the methods 800 and 900. FIG. 8 illustrates a motion-sensor activation method 800 for sensing the presence of a person and directing an audible message to the person. The motion-sensor activation method 800 includes the steps of providing 802 a story lamp 600 with a motion sensor 614, detecting 804 a motion, communicating 806 the sensor event to the microcontroller 620, retrieving 808 an audible message, and transmitting 810 the audible message to a speaker 616. In one embodiment, the motion-sensor activation method 800 begins and a story lamp 600 with a motion sensor 614 is provided 802. The motion sensor 614 detects 804 a motion and communicates 806 the sensor event to the microcontroller 620. The microcontroller 620 subsequently retrieves 808 an audible message from a memory device 624 and transmits 810 the audible message to a speaker 616.

In an alternative embodiment, the audible message may be activated by another source, such as a sound sensor, a control, a touch-sensitive switch, a wireless communication device, a network, a timer, a USB connection 632, or the like. Referring now to FIG. 9, a wireless activation method 900 may include the steps of providing 902 an audible story lamp 600 with a wireless communication device 630, receiving 904 a wireless communication, determining 906 whether the communication contains an audible message, retrieving 908 an audible message from a memory device 624, and transmitting 910 the audible message to a speaker 616. In a further embodiment, the wireless activation method 900 includes the steps of determining 912 whether to store the audible message and storing 914 the audible message.

In one embodiment, the wireless activation method 900 begins and an audible story lamp 600 with a wireless communication device 630 is provided 902. The wireless communication device 630 receives 904 a communication from a transmitting device such as a networked computer, a cellular phone, a networked story lamp 600, a story lamp companion, or the like. The received communication maybe sent to the microcontroller 620. In response, the microcontroller may determine 906 whether the communication contains an audible message. If no sound message is communicated over the wireless connection, the microcontroller 620 may retrieve 908 an audible sound message and transmit 910 the sound signal to a speaker 616. If the wireless communication contains a sound message, the microcontroller 620 may determine 912 whether to store the audible message. The microcontroller 620 may subsequently store 914 the audible message to a memory device 624 and/or transmit the audible message to a speaker 616.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A lamp for sensing the presence of a person and directing an audible message to the person, the lamp comprising:
   a housing;
   at least one communication device configured to receive audible messages from a computing device;
   at least one sensor disposed within the housing, the sensor configured to detect a sensor event;
   at least one speaker connected with the at least one sensor, the speaker configured to transmit an audible message;
   a light source disposed within the housing, the light source configured to emit light and to function independently of the sensor; and
   a microcontroller disposed within the housing and configured to initiate communication of the audible message in response to a sensor event detected by the sensor.

2. The apparatus of claim 1, wherein the at least one sensor is selected from the group consisting of an audio sensor, a motion sensor, and a touch-sensitive switch.

3. The apparatus of claim 1, further comprising a memory device connected to the microcontroller, the memory device configured to store at least one audible message.

4. The apparatus of claim 3, wherein the memory device comprises ROM memory.

5. The apparatus of claim 3, wherein the memory device comprises rewritable memory.

6. The apparatus of claim 1, further comprising a microphone connected to the microcontroller, the microphone configured to enable creation of an audible message.

7. The apparatus of claim 1, wherein the at least one communication device comprises a a wireless communication device configured to transmit and receive wireless communications.

8. The apparatus of claim 1, wherein the at least one communication device comprises a USB connection.

9. The apparatus of claim 1, wherein the computing device is selected from the group consisting of a computer, a network of computing devices, a wireless communication device, a cellular phone, a USB compatible device, and a personal data assistant.

10. The apparatus of claim 1, further comprising a removable memory card configured to store at least one audible message.

11. The apparatus of claim 1, wherein the light source is an LED light.

12. The apparatus of claim 1, further comprising a plurality of LED lights configured to pulsate in relation to an audible message.

13. The apparatus of claim 1, further comprising a removable decorative lens.

14. The apparatus of claim 1, further comprising a projector lens configured to project light images onto a surface.

15. The apparatus of claim 1, wherein the housing comprises a base for stabilizing the lamp and an extension configured to receive a decorative lens.

16. A system for sensing the presence of a person and directing an audible message to the person, the system comprising:
    a lamp comprising;
       a housing;
       at least one communication device configured to receive audible messages from a computing device;
       at least one sensor disposed within the housing, the sensor configured to detect a sensor event;
       at least one speaker connected with the at least one sensor, the speaker configured to transmit an audible message;
       a light source disposed within the housing, the light source configured to emit light and to function independently of the sensor; and
       a microcontroller disposed within the housing and configured to initiate communication of the audible message in response to a sensor event detected by the sensor; and
    at least one removable memory device configured to store an audible message.

17. The system of claim 16, wherein the at least one sensor is selected from the group consisting of an audio sensor, a motion sensor, and a touch-sensitive switch.

18. The system of claim 16, wherein the at least one communication device comprises a wireless communication device, the wireless communication device configured to transmit and receive wireless communications.

19. The system of claim 18, further comprising a companion electronic transmitting/receiving device configured to wirelessly communicate with the lamp.

20. The system of claim 16, wherein the lamp further comprises a memory device disposed within the housing and connected to the microcontroller, the memory device configured to store at least one audible message.

21. The system of claim 20, wherein the at least one memory device is rewritable memory.

22. The system of claim 16, further comprising a rack for storing a plurality of removable memory devices.

23. A method for sensing the presence of a person and directing an audible message to the person, the method comprising:
    providing a lamp comprising;
       a housing;
       at least one communication device configured to receive audible messages from a computing device;
       at least one motion sensor disposed within the housing, the motion sensor configured to detect a sensor event;

at least one speaker connected with the at least one sensor, the speaker configured to transmit an audible message;

a light source disposed within the housing, the light source configured to emit light and to function independently of the sensor; and a microcontroller disposed within the housing and configured to initiate communication of the audible message in response to a sensor event detected by the sensor;

detecting a motion and sending a communication to the microcontroller;

retrieving an audible message; and transmitting the audible message to a speaker.

24. A method for sensing the presence of a person and directing an audible message to the person, the method comprising:

providing a lamp comprising;

a housing;

at least one sensor disposed within the housing, the sensor configured to detect a sensor event;

at least one speaker connected with the at least one sensor, the speaker configured to transmit an audible message;

a wireless communication device configured to transmit and receive wireless communications;

a light source disposed within the housing, the light source configured to emit light and to function independently of the sensor; and a microcontroller disposed within the housing and configured to initiate communication of the audible message in response to a sensor event detected by the sensor;

receiving a communication via a wireless connection; and retrieving an audible message.

25. The method of claim 24, further comprising transmitting the audible message to a speaker.

26. The method of claim 24, further comprising storing an audible message in a memory device.

27. A lamp for sensing the presence of a person and directing an audible message to the person, the lamp comprising:

a housing;

a removable memory card configured to store at least one audible message;

at least one sensor disposed within the housing, the sensor configured to detect a sensor event;

at least one speaker connected with the at least one sensor, the speaker configured to transmit an audible message;

a light source disposed within the housing, the light source configured to emit light and to function independently of the sensor; and a microcontroller disposed within the housing and configured to initiate communication of the audible message in response to a sensor event detected by the sensor.

28. A system for sensing the presence of a person and directing an audible message to the person, the system comprising:

a lamp comprising;

a housing;

at least one communication device configured to receive audible messages from a computing device;

at least one sensor disposed within the housing, the sensor configured to detect a sensor event;

at least one speaker connected with the at least one sensor, the speaker configured to transmit an audible message;

a light source disposed within the housing, the light source configured to emit light and to function independently of the sensor; and a microcontroller disposed within the housing and configured to initiate communication of the audible message in response to a sensor event detected by the sensor;

at least one removable memory device configured to store an audible message; and a rack for storing a plurality of removable memory devices.

29. A lamp for sensing the presence of a person and directing an audible message to the person, the lamp comprising:

a housing;

a microphone;

a memory configured to capture an audible message from the microphone for subsequent playback;

at least one sensor disposed within the housing, the sensor configured to detect a sensor event;

at least one speaker connected with the at least one sensor, the speaker configured to transmit the audible message;

a light source disposed within the housing, the light source configured to emit light and to function independently of the sensor; and a microcontroller disposed within the housing and further configured to initiate communication of the audible message in response to a sensor event detected by the sensor.

* * * * *

UNITED STATES PATENT AND TRADEMARK OFFICE
CERTIFICATE OF CORRECTION

PATENT NO. : 7,264,377 B2
APPLICATION NO. : 11/053787
DATED : September 4, 2007
INVENTOR(S) : Rita Cooper et al.

It is certified that error appears in the above-identified patent and that said Letters Patent is hereby corrected as shown below:

Column 4 Line 20
"embodiment of an motion-sensor" should read --embodiment of a motion-sensor--

Column 5 Line 27
"or devices maybe used" should read --or devices may be used--

Column 7 Line 31
"selected message may be" should read --selected messages may be--

Column 11 Line 9
"communication maybe sent" should read --communication may be sent--

Column 11 Line 61
"device comprises a a wireless" should read --device comprises a wireless--

Signed and Sealed this

Thirteenth Day of November, 2007

JON W. DUDAS
*Director of the United States Patent and Trademark Office*